United States Patent [19]

Yadegar

[11] Patent Number: 5,411,070
[45] Date of Patent: May 2, 1995

[54] SELF-CONTAINED ANTI-SKID DEVICE FOR PNEUMATIC TIRES

[76] Inventor: Iraj Yadegar, P.O. Box 1635, Studio City, Calif. 91604

[21] Appl. No.: 13,250

[22] Filed: Feb. 3, 1993

Related U.S. Application Data

[63] Continuation-in-part of Ser. No. 505,067, Apr. 5, 1990.

[30] Foreign Application Priority Data

Feb. 11, 1992 [WO] WIPO .............. PCT/US92/01086

[51] Int. Cl.6 .................... B60C 5/20; B60C 23/12
[52] U.S. Cl. ................................ 152/210; 152/415; 152/426; 152/418; 152/337.1; 152/341.1
[58] Field of Search .............. 152/208, 167, 210, 211, 152/415, 337.1, 338.1, 341.1, 342.1, 425, 426, 331.1, 418, 419, 424, 423

[56] References Cited

U.S. PATENT DOCUMENTS

| | | | |
|---|---|---|---|
| 2,030,592 | 2/1936 | Hosking | 152/425 X |
| 2,480,548 | 8/1949 | Carhart | 152/208 |
| 2,781,813 | 2/1957 | Ferguson | 152/208 |
| 2,841,199 | 7/1958 | Voelkel et al. | 152/208 |
| 2,888,056 | 5/1959 | Zahlten | 152/208 |
| 2,941,566 | 6/1960 | Prince | 152/208 |
| 3,095,918 | 7/1963 | Mike | 152/208 |
| 3,766,956 | 10/1973 | Ruane et al. | 152/208 |
| 4,676,289 | 6/1987 | Yi Su | 152/208 |
| 4,815,513 | 3/1989 | Hirakawa | 152/208 X |
| 4,840,212 | 6/1989 | Wei | 152/425 X |

FOREIGN PATENT DOCUMENTS 2600797 7/1977 Germany ............... B60C 11/16

Primary Examiner—Michael W. Ball
Assistant Examiner—Francis J. Lorin

[57] ABSTRACT

A self-contained anti-skid device to be used with a pneumatic tire (32) for boosting traction against slippery roadways covered with ice and snow while all designated characteristics of the tire against other road conditions are fully preserved, comprising: a plurality of projectable and retractable anti-skid pins (20) to be positioned radially at a tread (34) of the tire (32) for being projected from the tread (34), as often as required, when a plurality of expandable pneumatic chambers (26) adjacent to the pins (20) are pressurized using merely a fraction of the actual pressurized air of the tire (32). To retract the pins (20), air from the expandable pneumatic chambers (26) is released and preferably recycled back into the tire (32) through an air recycling device (64) implanted within the tread (34) and actuated by rotation of the tire (32) on a roadway. An air valve directs a flow of air from the tire (32) to the expandable pneumatic chambers (26) and therefrom preferably to an air recycling device. The air valve is controlled either manually (92) in the locality of the tire, remotely (100) within reach of a driver even while driving, or automatically (102), through a temperature sensing device implanted within the tread (34) as the tire (32) rotates over sporadically icy road conditions.

12 Claims, 10 Drawing Sheets

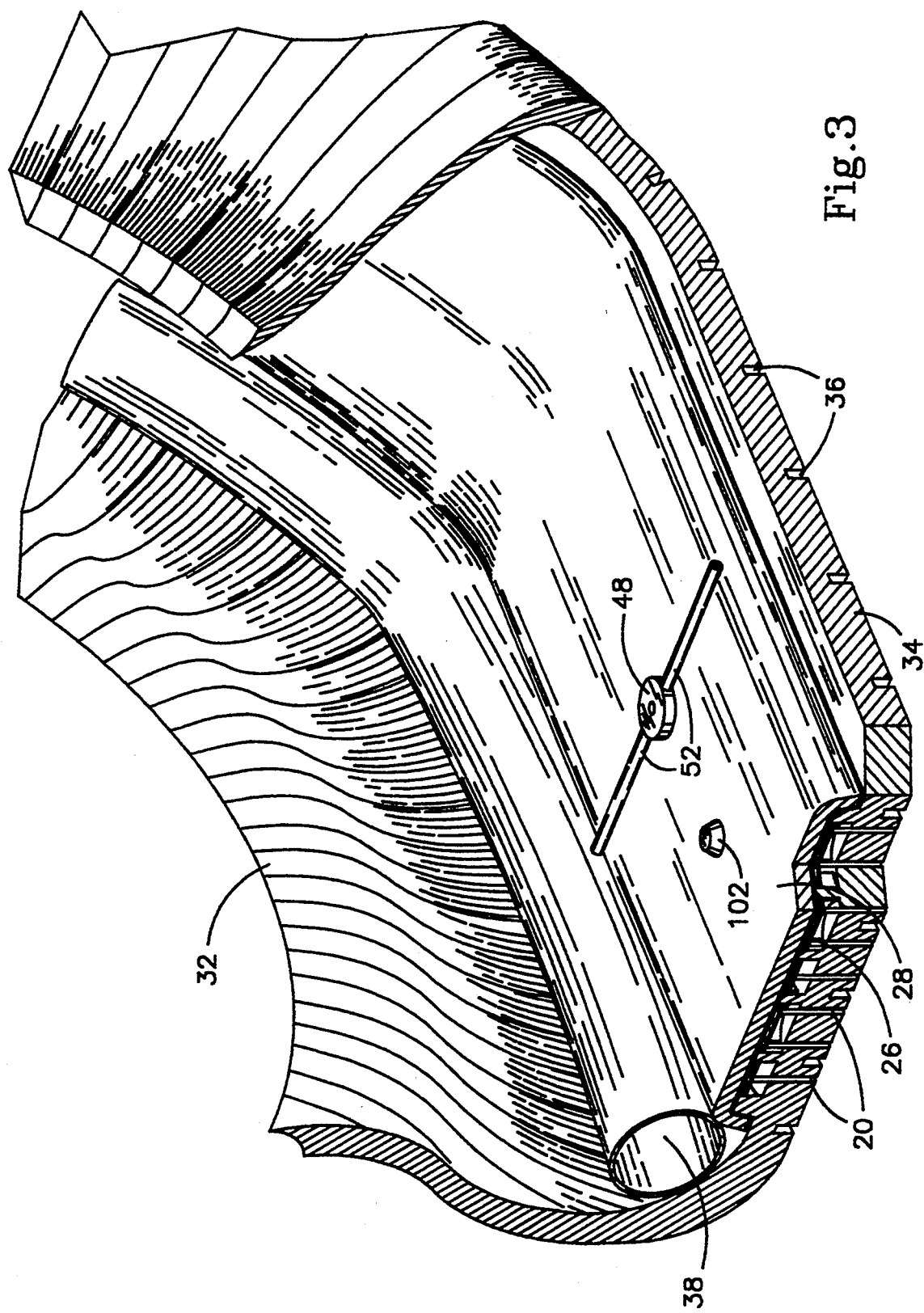

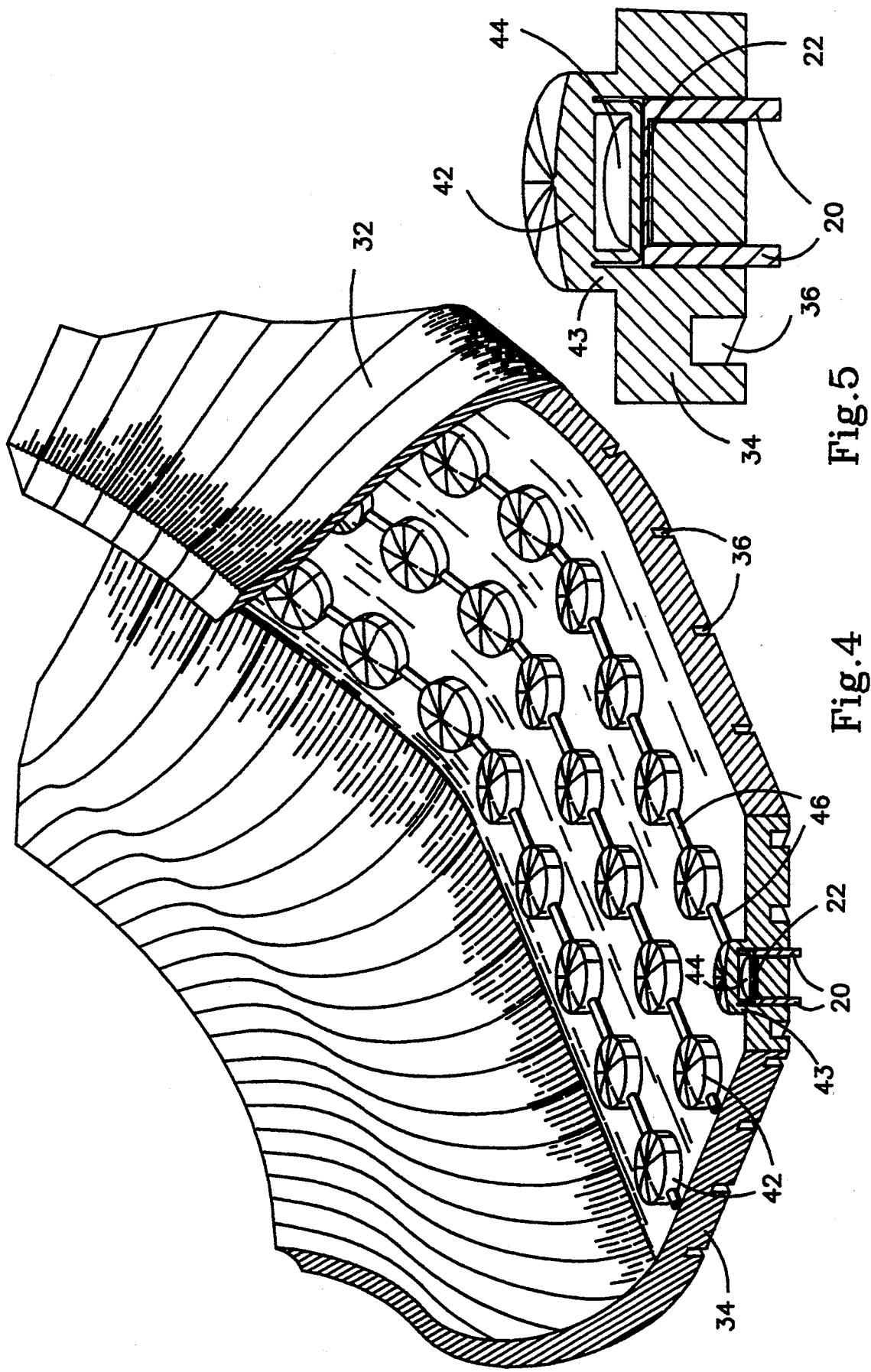

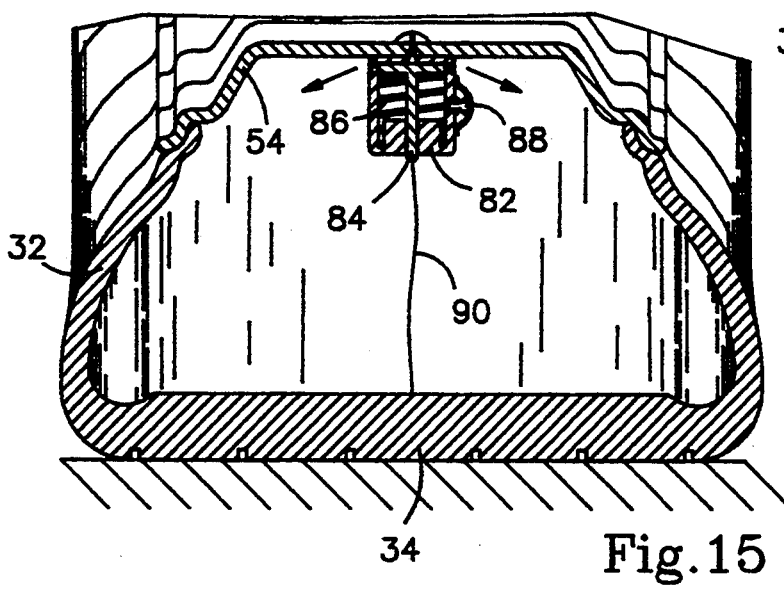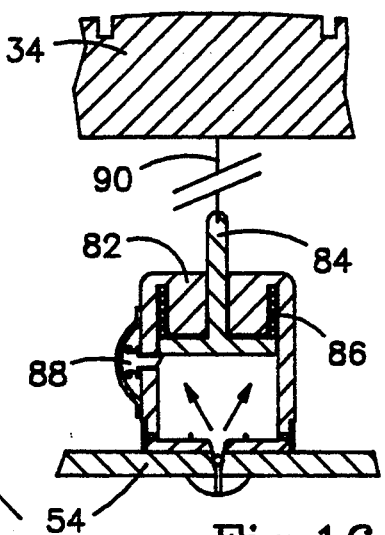
Fig.15    Fig.16
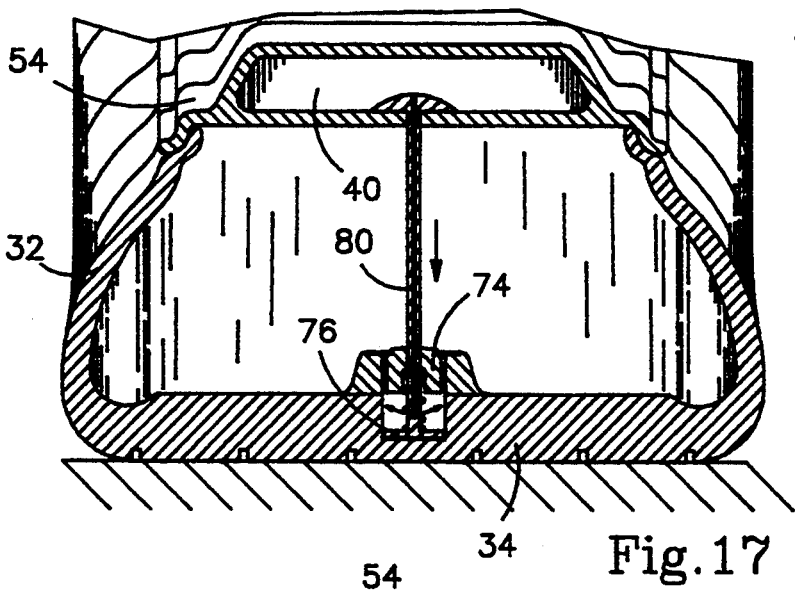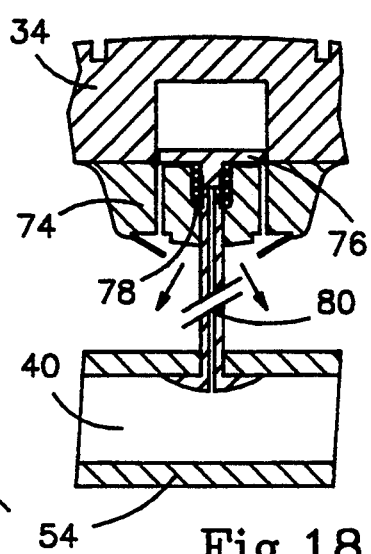
Fig.17    Fig.18
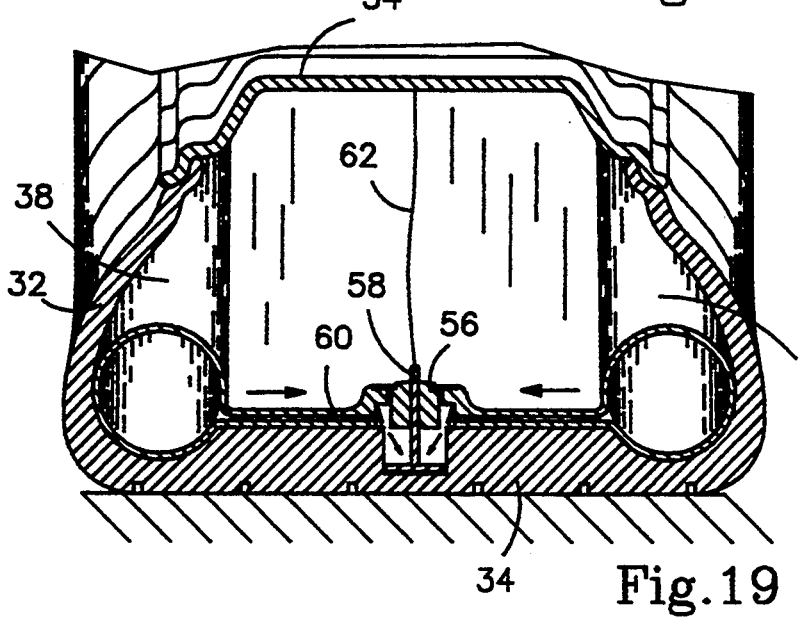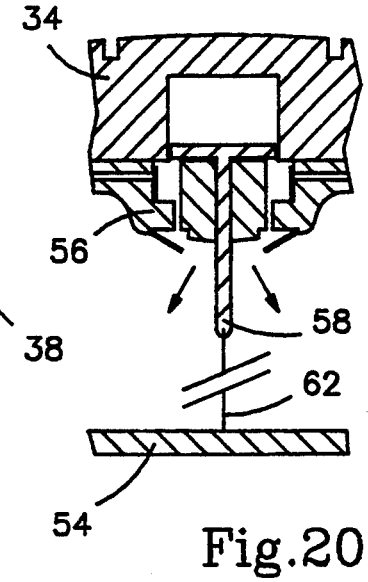
Fig.19    Fig.20

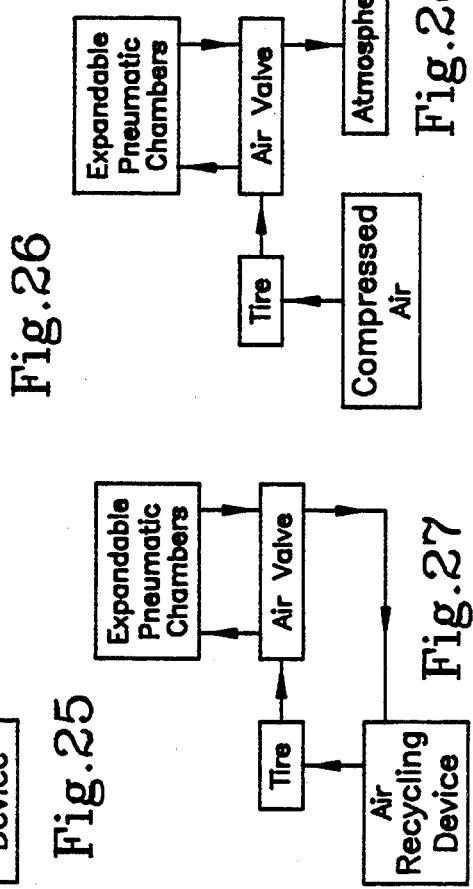
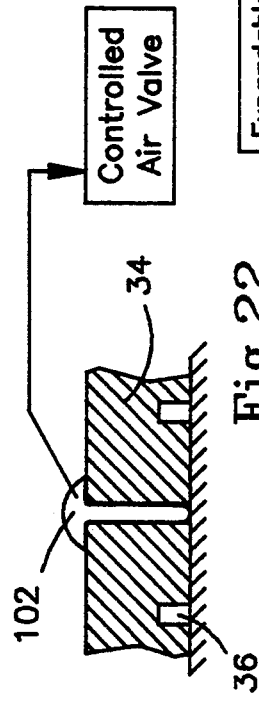
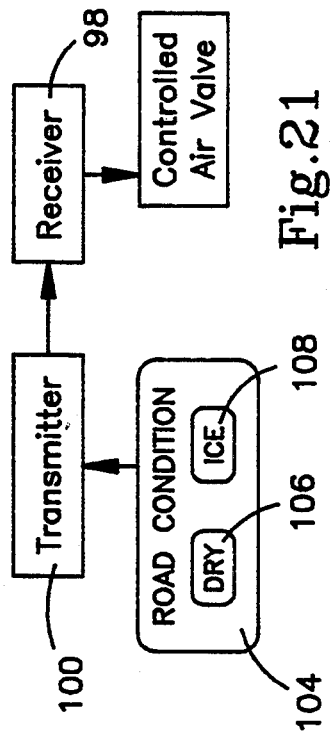
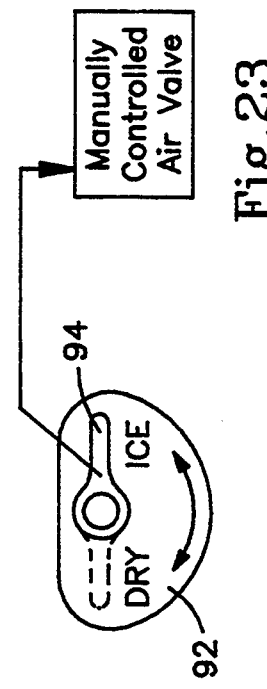
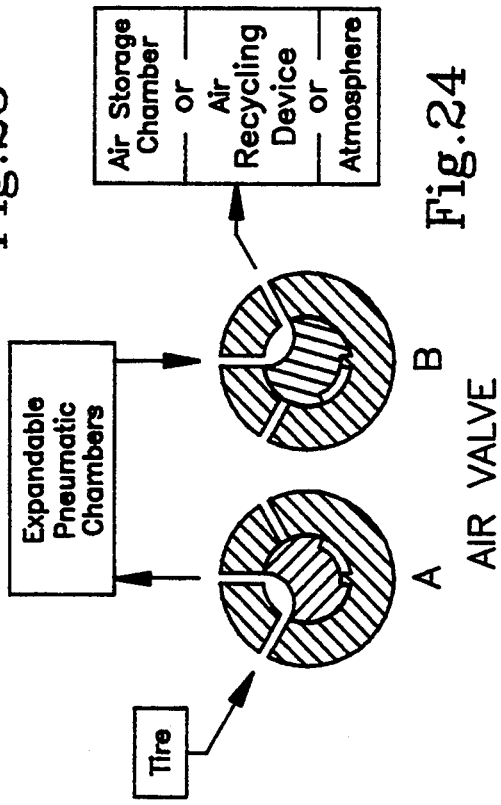

SELF-CONTAINED ANTI-SKID DEVICE FOR PNEUMATIC TIRES

This application is a continuation-in-part of my U.S. patent application under Ser. No. 07/505,067, filed Apr. 5, 1990, that has become abandoned in favor of this application.

DESCRIPTION

1. Technical Field

This invention relates to anti-skid devices applied to pneumatic tires, more particularly, to anti-skid devices having anti-skid pins that project and retract from a tread of a pneumatic tire for boosting traction against slippery roadways covered with ice and snow.

2. Background Art

To increase traction of a pneumatic tire against slipper roadways covered with ice and snow, numerous anti-skid devices having anti-skid pins that project and retract from a tire tread have been proposed. Such devices generally contain a plurality of anti-skid pins to be positioned at a tread of a pneumatic tire; said pins are to be projected from the tread when a plurality of expandable pneumatic chambers adjacent to the pins are pressurized, and retracted when said expandable pneumatic chambers are depressurized.

The source of compressed air for pressurization of the expandable pneumatic chambers in such devices is generally supplied by either an electrically driven or engine powered air compressor, or provided by a compressed air or gas cylinder that is somehow connected to the tires.

The following patents illustrate proposed anti-skid devices having projectable and retractable anti-skid pins: U.S. Pat. No. 4,676,289 issued to Cherng Ye Su on Jan. 30, 1987 discloses an automobile tire having retractable tread studs. U.S. Pat. No. 2,781,813 issued to Ferguson on Feb. 19, 1957 discloses a type of traction wheel construction. U.S. Pat. No. 4,815,513 issued to Kiyohiro Hirakawa on Mar. 28, 1989 discloses an anti-skid device for preventing slippage of an automobile tire.

The idea of transferring compressed air from an outside source, or attachment of an air or gas cylinder to a rotating and vibrating tire might conceivably work; however, the implementation would be difficult and highly impractical. Furthermore, air compressors or compressed air cylinders provide high pressure, and therefore, due to the limited capacity of the expandable members, a simple malfunction or carelessness of the user may easily over-inflate and explode those members, causing serious problems.

DISCLOSURE OF INVENTION

Accordingly, I claim the following as the principal object and advantages of the present invention: The principal object is to provide a self-contained anti-skid device to be used with a pneumatic tire for boosting traction against slippery roadways covered with ice and snow while all other designated characteristics of the tire are fully maintained.

The present invention basically includes a plurality of anti-skid pins to be implanted radially at a tread of a pneumatic tire for being projected from the tread, when a plurality of expandable pneumatic chambers adjacent to the pins are pressurized, and retracted when said expandable pneumatic chambers are depressurized.

Source of compressed air used for pressurization of the expandable pneumatic chambers in the present invention is confined solely to the actual pressurized air of the tire.

Utilization of tire pressure air for pressurization of the expandable pneumatic chambers in the present invention fully eliminates requirement for any compressed air or gas source whatsoever, eradicates all problems produced by such sources and, consequently, delivers a better, safer, more practical, versatile and economical anti-skid device for pneumatic tires.

Due to its extreme versatility, the present invention is fully applicable to pneumatic tires of all types, shapes, and purpose; and by providing the additional aforementioned feature it may indeed give a new meaning to the term all season tire.

BRIEF DESCRIPTION OF DRAWINGS

FIG. 3 shows an embodiment of the present invention that also includes an air storage chamber circumferentially molded within the tire, a temperature sensing device, and an air pump implanted within the tire tread.

FIG. 4 shows an embodiment of the present invention in a plurality of individual units.

FIG. 5 is an enlarged sectional view of an individual anti-skid unit.

FIGS. 15 and 16 show an air recycling device with an air pressure controlling device that stops the pumping action when the tire air pressure reaches its proper level.

FIGS. 17 and 18 show an air recycling device actuated as in FIG. 7, and the retracting means of the rod serve also as air passage means.

FIGS. 19 and 20 show the air recycling device as in FIG. 7, pumping air from the air storage chambers into the tire.

FIG. 21 shows a control panel for selection of either "dry" or "ice" mode of the tire in compliance with current road conditions. This figure also indicates that a signal is send through a transmitter to a receiver that actuates a controllable air valve.

FIG. 22 shows a temperature sensing device implanted within the tread to actuate the controllable air valve as the tire rotates over sporadically frozen and unfrozen road surfaces.

FIG. 23 shows a manually controlled air valve.

FIG. 24 shows an air valve directing a flow of air from the tire to the expandable pneumatic chambers when in position "A," and from the expandable pneumatic chambers, selectively, to either an air storage chamber, an air recycling device, or the atmosphere when in position "B."

FIGS. 25, 26, 27 and 28 show four different circulations of air, in compliance with the requirements of a tire.

DESCRIPTION OF THE PREFERRED EMBODIMENTS

Figure 1:
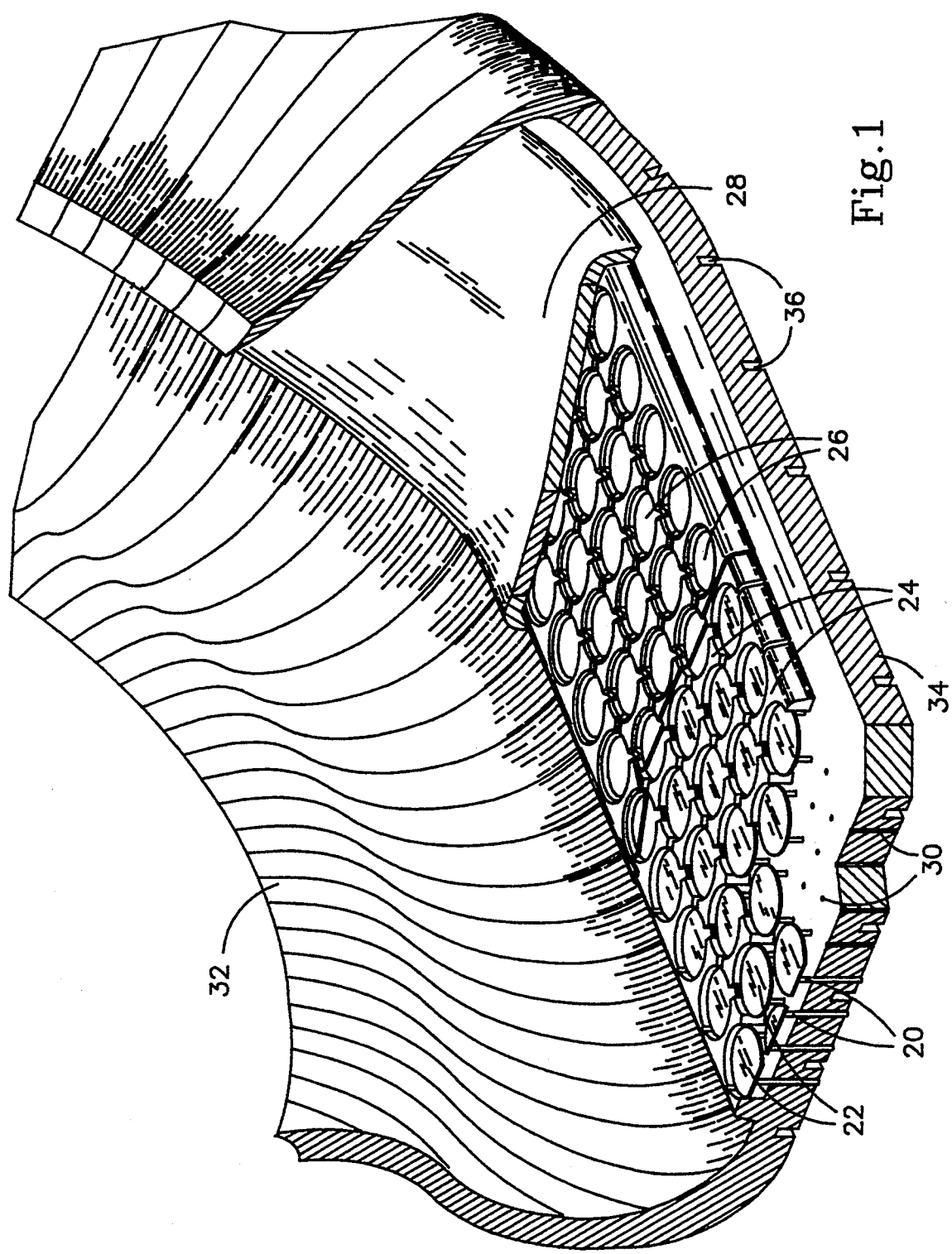
FIG. 1 is a perspective fragmentary plan view of a pneumatic tire equipped with an embodiment of the present invention that includes a plurality of anti-skid pins, a plurality of supports forming hollow cells, a plurality of depressurized expandable pneumatic chambers, and a cover.
Figure 2:
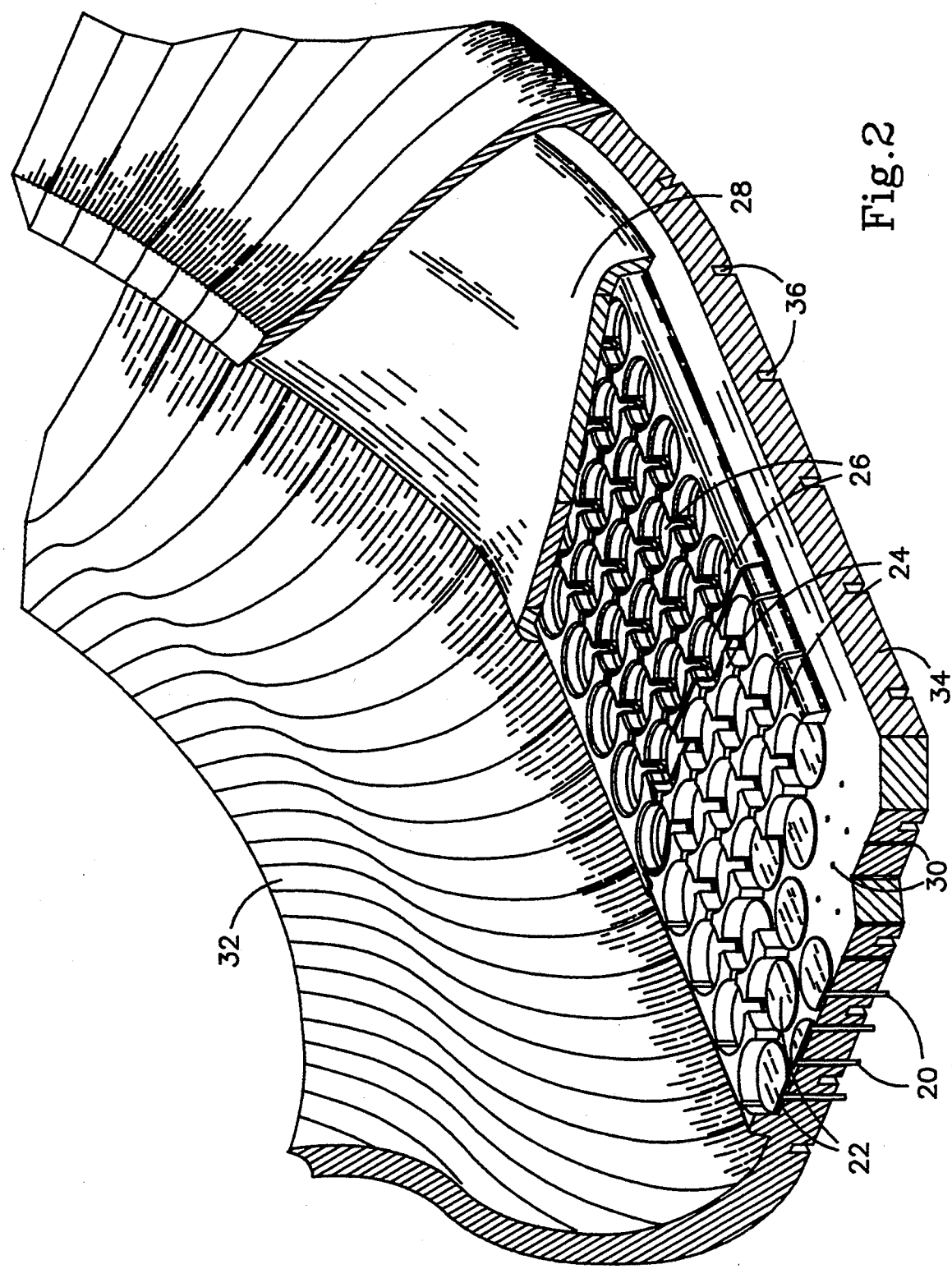
FIG. 2 shows the expandable pneumatic chambers when they are pressurized, with the anti-skid pins projected.
Figure 6:
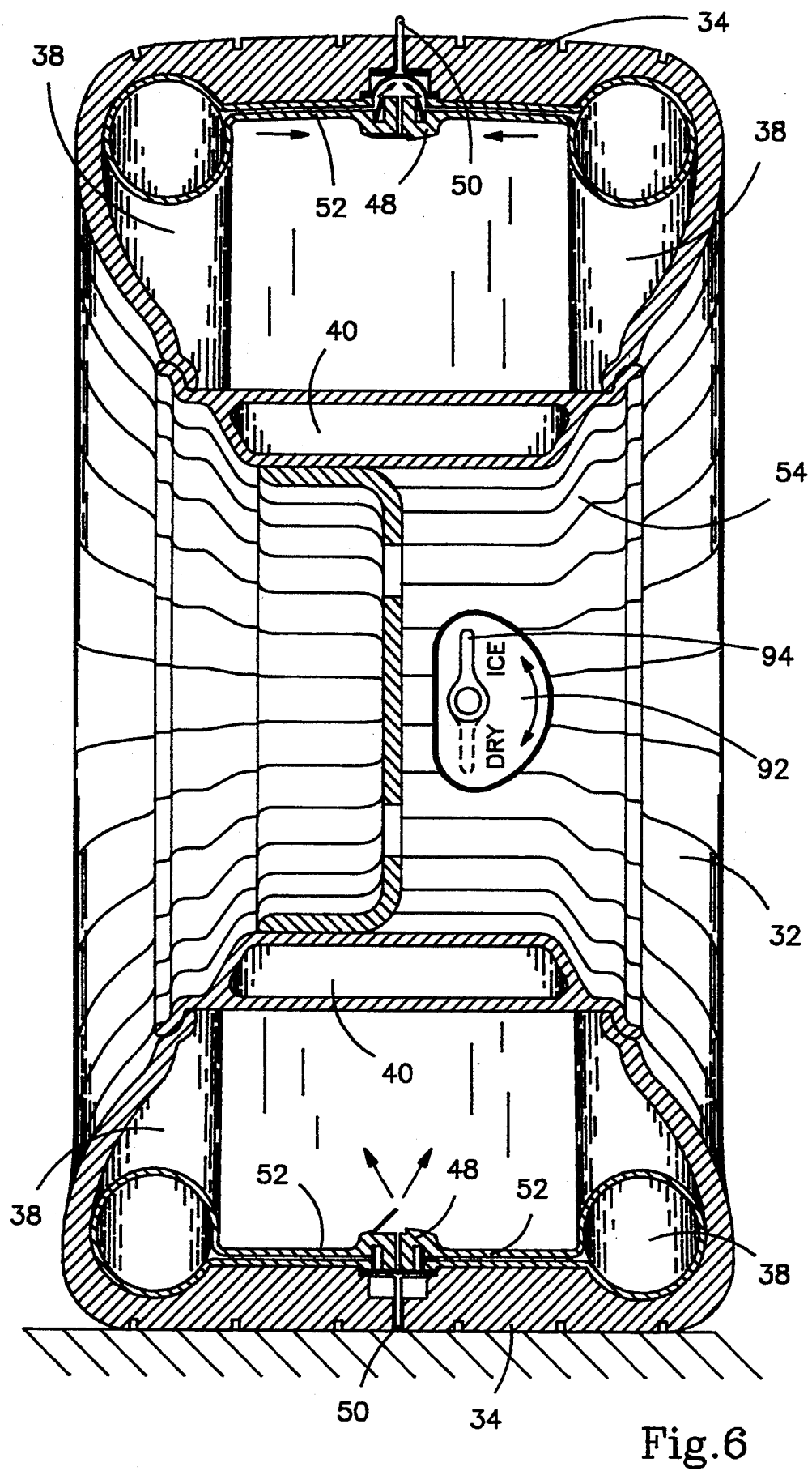
FIG. 6 is a cross-sectional view of a tire and a wheel assembly showing a rod of an air recycling device protruding from the outer surface of the tread when said device is filled with air from the air storage chambers. This figure also shows how the pumping action is achieved as the tire rotates on a surface, and a manually controlled air valve placed on the wheel assembly.
Figure 7:
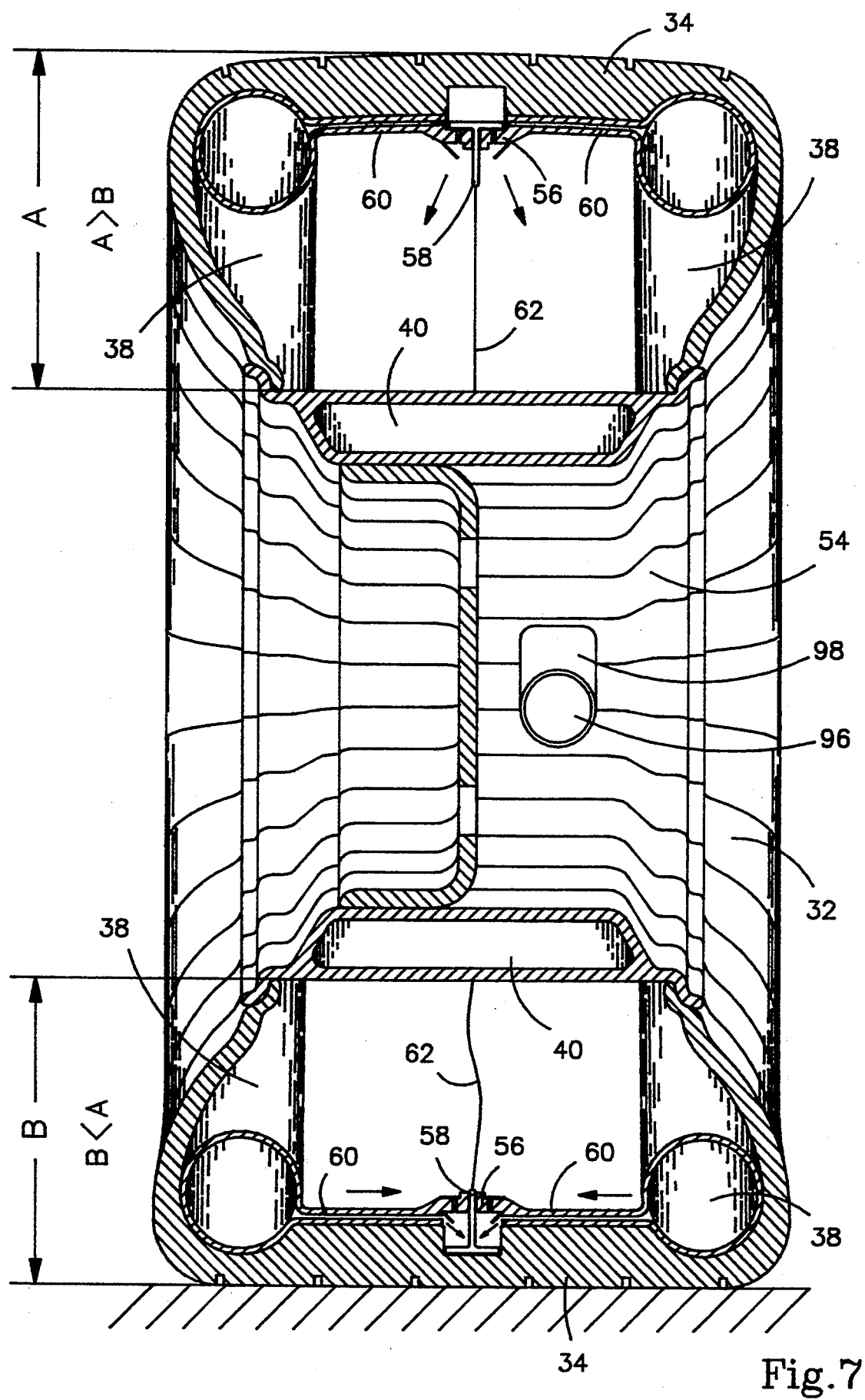
FIG. 7 shows a rod of an air recycling device protruding from the inner surface of the tread and actuated by the rotation of the tire on a roadway, given that "A" is always larger than "B." This figure also shows a controllable air valve containing a receiver placed on the wheel assembly.
Figure 8:
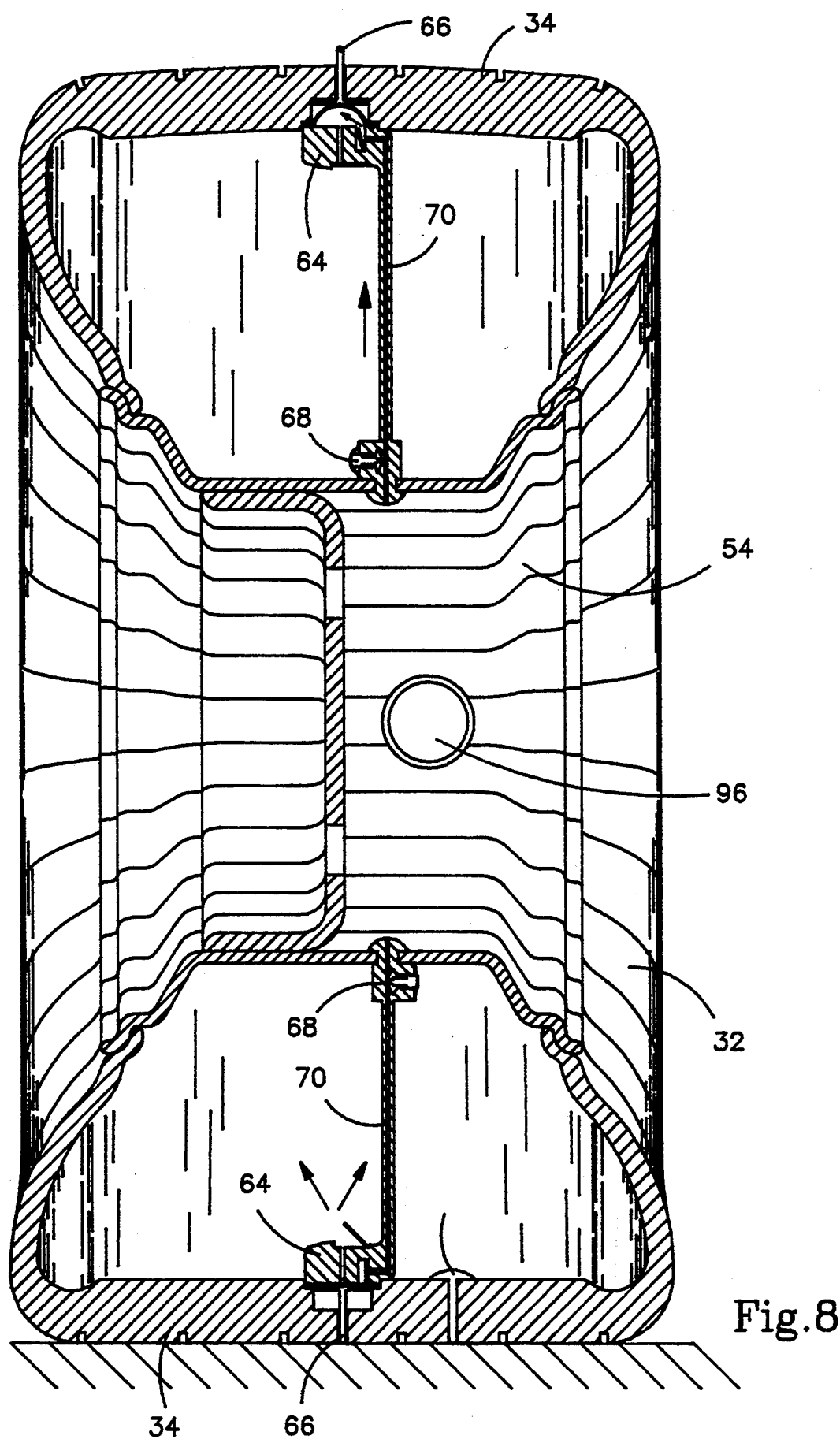
FIG. 8 shows the air recycling device as illustrated in FIG. 6, pumping air from the atmosphere into the tire through an air pressure controlling device. This figure also shows a temperature sensing device implanted in the tire tread, and an air valve placed on the wheel assembly.
Figure 9:
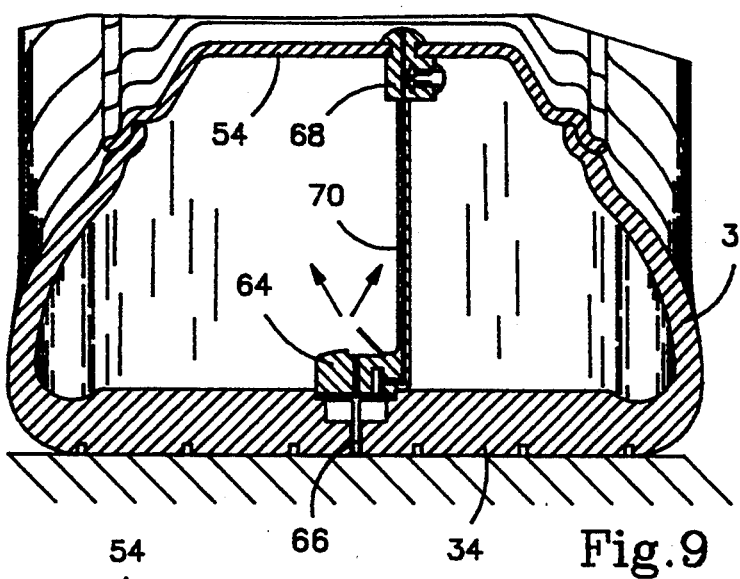
FIG. 9 shows an air pump pumping air from the atmosphere into the tire through an air pressure controlling device.
Figure 10:
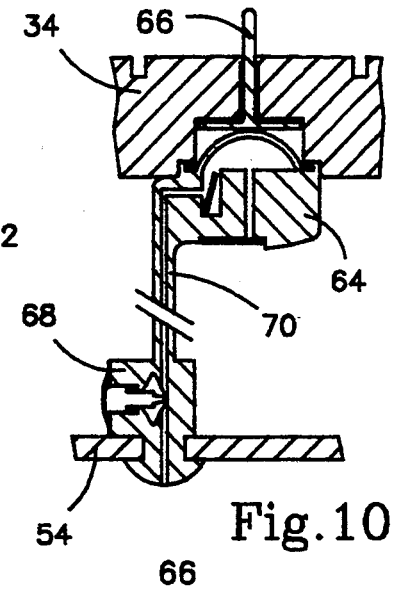
FIG. 10 shows the air pressure controlling device of FIG. 9 while blocking the airway as tire air pressure reaches its proper level.
Figure 11:
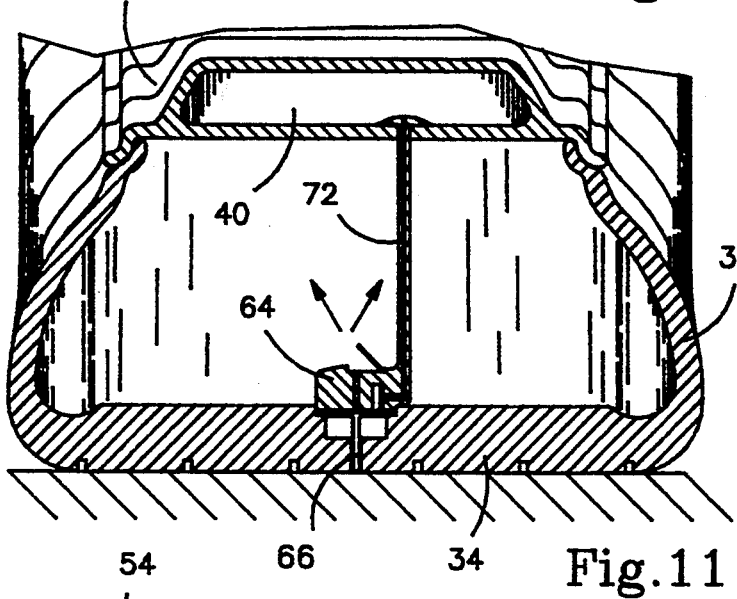
FIGS. 11 and 12 show the circulation of air in a closed pneumatic circuit, from an air storage chamber within the wheel assembly into the tire.
Figure 12:
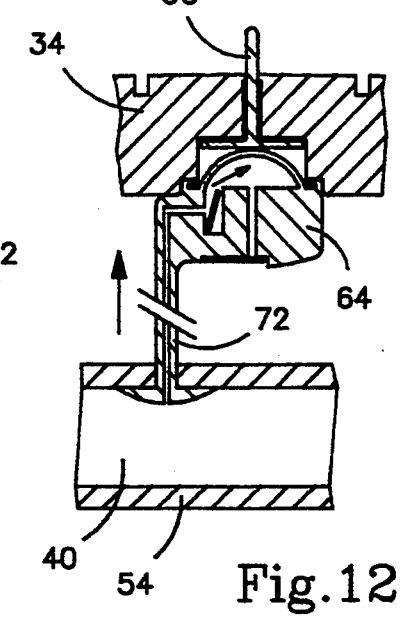
Figure 13:
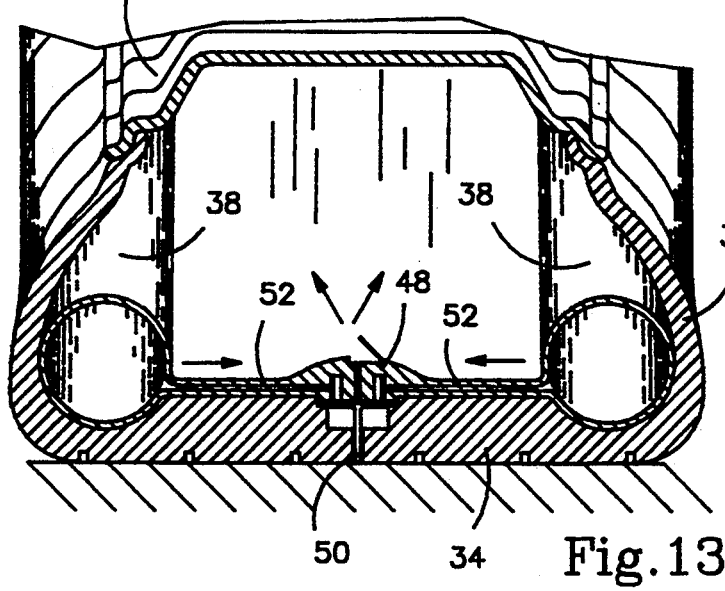
FIGS. 13 and 14 show a circulation of air in a closed pneumatic circuit, from an air storage chamber within the tire, into the tire itself.
Figure 14:
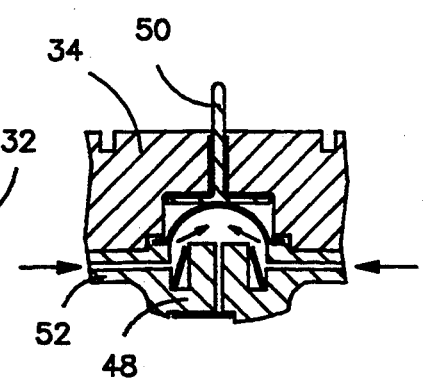

FIGS. 1 and 2 show an embodiment of a self-contained anti-skid device according to the principles of the present invention, and FIGS. 4 and 5 show such embodiments in a plurality of individual units.

The self-contained anti-skid device of the present invention basically includes, a plurality of anti-skid pins 20, a plurality of expandable pneumatic chambers 26, 44, a plurality of supports 24, 43, a protective cover 28, 42, and an air valve 92, 96. Furthermore, according to the type, shape, or purpose of a tire, The present invention may also include an air storage chamber 38, 40, an air recycling device 48, 56, 64, 74, 82, and an air pressure controlling device 68.

The pins 20 are to be positioned radially at a tread of a pneumatic tire 32, preferably within the tread holes 30, to be projected and retracted from the outer preferable surface of the tread 34 as often as required. Each pin 20, either individually or in a group, preferably is attached to a base 22; said base 22 serves the purpose of providing adequate support and facilitating the projection process of the pins 20.

The expandable pneumatic chambers 26, 44 are placed circumferentially adjacent to the bases 22. Their purpose is to apply pressure to said bases 22 equivalent to the tire 32 air pressure that projects the pins 20 from the outer preferable surface of the tread 34 when said expandable pneumatic chambers 26, 44, are pressurized by a flow of air derived from the actual pressurized air of the tire 32.

The supports 24, 43, are to form hollow cells to accommodate, protect, and seal the pins 20 and the expandable pneumatic chambers 26, 44 from the pressurized air of the tire 32.

The air valve 92, 96 is to selectively direct a flow of air from the tire 32 to the expandable pneumatic chambers 26, 44, when the pins 20 are to be projected, and furthermore, to allow the air from the expandable pneumatic chambers 26, 44 to be released to either (a) an air recycling device 48, 56, 64, 74, 82, or (b) an air storage chamber 38, 40, or (c) the atmosphere, when the pins 20 are to be retracted.

The air valve 92, 96, controlled either (a) manually, 94 in the locality of the tire 32 or the wheel assembly 54, or (b) remotely, 106 and 108, through a transmitter 100 and a receiver 98 in which said transmitter is preferably positioned within the reach of a driver, and the receiver 98, preferably attached to the air valve 92, 96, or (c) automatically, through a temperature sensing device 102 preferably implanted within the tire tread 34.

For projection of the pins 20 from the tread 34, the controllable air valve 92, 96, discharges a flow of pressurized air from the tire 32 to the expandable pneumatic chambers 26, 44. Considering the air capacity of the expandable pneumatic chambers 26, 44, is significantly less than the tire 32 air capacity, just a fraction of the pressurized air of the tire 32 would be sufficient for an effective pressurization of the expandable pneumatic chambers 26, 44, with pressure nearly equivalent to the tire 32 air pressure.

EXAMPLE:

Pins 20 are positioned radially at the tread 34. At any given time about 90% of the pins are not in touch with a road surface, and the only resisting force challenging said pins 20 from being projected, would be the inherent friction that holds the pins 20 inside the tread-holes 30.

The amount of such friction is measured and adjusted to a desired level, preferably by assigning appropriately sized tread-holes 30 for the pins 20. Such friction must be set below the tire air pressure, for instance, 20 psi (pounds per square inch) or 1.5 kg/cm2 (kilograms per square centimeter) for a 30 psi or 2.25 kg/cm2 tire air pressure. Thus, there would be 30 psi versus 20 psi or 2.25 kg/cm2 versus 1.5 kg/cm2 for projection of the pins 20 from the tread 34.

On the other hand, the required force to retract the pins 20 back inside the tread 34 must be more than the cumulative pressure from the expandable pneumatic chambers 26 upon the bases 22, of 30 psi or 2.25 kg/cm2, plus the resistance level of the tread-holes 30 of 20 psi or 1.5 kg/cm2.

In this example, with surface of each pin base 22 of 1 in2 or 6.45 cm2, it would be 30+20=50 psi, or 2.25+1.5=3.75 kg/cm2.

In an average tire suitable for a 4000 lb or 1,814 kg four wheel vehicle, there is approximately 50 in2 or 322 cm2 of contact between each tire tread 34 and a road surface or 20 lb/in2 that is equivalent to 1.41 kg/cm2.

With one pin base 22 placed in every 2 in2 or 12.9 cm2 of the tire tread 34, there would 40 lb or 18.14 kg of force exerted upon each base 22, which is 10 lb or 4.53 kg less than the force required to push the pins back inside the tread 34.

By reducing the air pressure from the expandable pneumatic chambers 26, 44, the force against the bases 22 will no longer be sufficient to hold the pins 20 in place, and the weight of the vehicle is the force that assists the retraction step, as the tire 32 rotates on a roadway.

In order to retract the pins 20, the pressurized air from the expandable pneumatic chambers 26, 44 must be released, and due to the structure, purpose, and requirements of a tire, such air is released to either (a) an air storage chamber 38, 44, (b) an air recycling device 48, 56, 64, 74, or (c) the atmosphere.

Releasing air from the expandable pneumatic chambers 24, 44 to the air storage chamber 38, 40 permits instant retraction of the pins 20, and allows circulation of the pressurized air of the tire 32 within a closed pneumatic circuit and, furthermore, assures that the tire 32 air pressure never exceeds its previous level.

This method of air circulation is more likely suitable for a tire 32 in which the instant retraction of the pins 20 and circulation of the pressurized air of the tire 32 within a closed pneumatic circuit is required.

Releasing air from the expandable pneumatic chambers 24, 44 to an air recycling device 48, 56, 64, 74, actuated by rotation of the tire 32 on a roadway permits (a) gradual retraction of the pins 20 harmonious to the rotation sequence of the tire 32 on a roadway and (b) circulation of the pressurized air of the tire 32 within a closed pneumatic circuit that furthermore assures that the tire 32 air pressure never exceeds its previous level. This method of air circulation is likely to be more suitable for most average tires, considering only a limited rotation of the tire 32 on a roadway is required for a full circulation of the air from the expandable pneumatic chambers 24,44, back into the tire.

Releasing air, from the expandable pneumatic chambers 24, 44, to the atmosphere, permits instant retraction of the pins 22. In such sequence, the tire 32 air pressure is brought back to its optimal level through either (a) conventional means or, (b) an air pump 64, 82 actuated by rotation of the tire 32 on a roadway for pumping air from the atmosphere into the tire 32. Such an air pump 64, 82 is preferably equipped with an air pressure controlling device or means to stop the pumping action as the tire 32 air pressure reaches its proper level.

Releasing air from the expandable pneumatic chambers 24, 44 to the atmosphere, is more likely suitable for tires having limited contact with a surface, as in the case of an airplane tire, or a tire in which the restoration of air through rotation of the tire on a surface is neither feasible nor desirable. This method of air circulation furthermore is applicable to a tire in which the instant retraction of the pins 20 is required, without the use of an air storage chamber 38, 40.

As shown in FIGS. 6, 8-14, an air recycling device 48, 64 actuated by rotation of the tire 32 on a roadway may furthermore be an air pump, having a rod 50, 66 that protrudes from the outer surface of the tread 34. Pumping action in such a pump is achieved as the rod 50, 66 is repeatedly pressed as the tire 32 rotates on a roadway.

As shown in FIGS. 7, 15-20, an air recycling device 56, 74, 82 actuated by rotation of the tire 32 on a roadway may furthermore be an air pump having a rod 58, 80, 84 that protrudes from the inner surface of the tread 34, or an air pump attached to the wheel assembly and having a protruding rod 84.

Pumping action in such devices is achieved as the rod 58, 80, 84 is repeatedly pulled by means of the fluctuation in distance between the tread 34 and the wheel assembly 54 where "A" is always larger than "B" due to the weight of a vehicle. This characteristic is clearly illustrated in FIG. 7.

As shown in FIGS. 17 and 18, the pulling means of the rod 76 of the pump 74 may also serve as air passage means that direct a flow of air from the air storage chamber 40 or the atmosphere into the air pump 74. In the event that air from the atmosphere is to be directed to the air pump 74, an air pressure controller device 68 is preferably required to control the tire air pressure and prevent it from exceeding its optimal level.

While the above description contains many specifications, the user should not construe these as limitations on the scope of the invention, but merely as an example of the preferred embodiment thereof. Those skilled in art and engineering design will envision many other possible variations within its scope. Accordingly the reader is requested to determine the scope of the invention by the appended claims and their legal equivalents, not by the given examples.

I claim:

1. A self-contained anti-skid device for use with a pneumatic tire to increase traction of the tire against a slippery surface comprising:
   (a) a plurality of projectable and retractable anti-skid pins to be implanted radially at a tread of the tire;
   (b) a plurality of expandable pneumatic chambers adjacent to the anti-skid pins to project the anti-skid pins from the outer peripheral surface of the tire tread when said expandable pneumatic chambers are pressurized by a flow of pressurized air from the actual pressurized air of the tire;
   (c) a plurality of adequate supports of sufficient size and strength accommodating the anti-skid pins and positioned to form hollow cells to store and seal the anti-skid pins and the expandable pneumatic chambers from the pressurized air of the tire; and
   (d) a controllable air valve to direct a flow of air selectively from the tire to the expandable pneumatic chambers and from the expandable pneumatic chambers to the atmosphere.

2. A self-contained anti-skid device for use with a pneumatic tire to increase traction of the tire against a slippery surface comprising:
   (a) a plurality of projectable and retractable anti-skid pins to be implanted radially at a tread of the tire;
   (b) a plurality of expandable pneumatic chambers adjacent to the anti-skid pins to project the anti-skid pins from the outer peripheral surface of the tire tread when said expandable pneumatic chambers are pressurized by a flow of pressurized air from the actual pressurized air of the tire;
   (c) a plurality of adequate supports of sufficient size and strength accommodating the anti-skid pins and positioned to form hollow cells to store and seal the anti-skid pins and the expandable pneuatic chambers from the pressurized air of the tire;
   (d) an air recycling device actuated by means of rotation of the tire on a surface for pumping air from the expandable pneumatic chambers into the tire; and
   (e) a controllable air valve to direct a flow of air selectively from the tire to the expandable pneumatic chambers and from the expandable pneumatic chambers to the air recycling device.

3. A self-contained anti-skid device for use with a pneumatic tire to increase traction of the tire against a slippery surface comprising:
   (a) a plurality of projectable and retractable anti-skid pins to be implanted radially at a tread of the tire;
   (b) a plurality of expandable pneumatic chambers adjacent to the anti-skid pins to project the anti-skid pins from the outer peripheral surface of the tire tread when said expandable pneumatic chambers are pressurized by a flow of pressurized air from the actual pressurized air of the tire;

(c) a plurality of adequate supports of sufficient size and strength accommodating the anti-skid pins and positioned to form hollow cells to store and seal the anti-skid pins and the expandable pneumatic chambers from the pressurized air of the tire;

(d) a controllable air valve to direct a flow of air selectively from the tire to the expandable pneumatic chambers and from the expandable pneumatic chambers to the atmosphere; and (e) an air recycling device actuated by means of rotation of the tire on a surface for pumping sufficient air from the atmosphere into the tire.

4. A self-contained anti-skid device for use with a pneumatic tire to increase traction of the tire against a slippery surface comprising:

(a) a plurality of projectable and retractable anti-skid pins to be implanted radially at a tread of the tire;

(b) a plurality of expandable pneumatic chambers adjacent to the anti-skid pins to project the anti-skid pins from the outer peripheral surface of the tire tread when said expandable pneumatic chambers are pressurized by a flow of pressurized air from the actual pressurized air of the tire;

(c) a plurality of adequate supports of sufficient size and strength accommodating the anti-skid pins and positioned to form hollow cells to store and seal the anti-skid pins and the expandable pneumatic chambers from the pressurized air of the tire;

(d) an air storage chamber of sufficient size and strength for temporary storage of air released from the expandable pneumatic chambers until such air is gradually recycled back to the tire;

(e) an air recycling device actuated by means of rotation of the tire on a surface for pumping air from the air storage chamber into the tire; and (f) a controllable air valve to direct a flow of air selectively from the tire to the expandable pneumatic chambers and from the expandable pneumatic chambers to the air storage chamber.

5. The anti-skid device of any of claims 1–4 wherein the controllable air valve is controlled manually from the reach of the tire or a wheel assembly.

6. The anti-skid device of any of claims 1–4 wherein the controllable air valve actuated by a receiver situated within the locality of the tire or a wheel assembly and said receiver is controlled by a transmitter that communicates with said receiver immaterially and from a remote location.

7. The anti-skid device of any of claims 1–4 wherein the controllable air valve includes a temperature sensing means that whereby said air valve is actuated automatically as the tire rotates over sporadically frozen and unfrozen surfaces.

8. The anti skid device of any of claims 2–4 wherein the air recycling device attached to the wheel assembly comprises a flexible pulling mean connecting said air recycling device with the inner surface of the tire tread to actuate said air recycling device by means of distance variations between the tire tread and the wheel assembly as the tire rotates on a surface.

9. The anti skid device of any of claims 2–4 wherein the air recylcing device attached to the tire tread comprises a flexible pulling mean connecting said air recylcing device with the inner surface of the wheel assembly to actuate said air recycling device by means of distance variations between the tire tread and the wheel assembly as the tire rotates on a surface.

10. The anti-skid device of claims 2 wherein the air recycling device comprises means that protrudes from the outer surface of the tire tread to actuate said air recycling device by the rotation of the tire on a surface for pumping air from the expandable pneumatic chambers into the tire.

11. The anti-skid device of claim 3 wherein the air recycling device comprises means that protrudes from the outer surface of the tire tread to actuate said air recycling device by the rotation of the tire on a surface for pumping air from the atmosphere into the tire.

12. The anti-skid device of claim 4 wherein the air recycling device comprises means that protrudes from the outer surface of the tire tread to actuate said air recycling device by rotation of the tire on a surface for pumping air from the air storage chamber into the tire.

* * * * *